United States Patent [19]

Reich

[11] 4,351,607
[45] Sep. 28, 1982

[54] ANALYZER APPARATUS FOR MEASURING AND ADJUSTMENT OF COLOR FILTERING EFFECTS AND/OR EXPOSURE ON MAKING PHOTOGRAPHIC PRINTS

[76] Inventor: Stefan Reich, Ulrichstrasse 68, D-8026 Irschenhausen, Fed. Rep. of Germany

[21] Appl. No.: 156,103

[22] Filed: Jun. 3, 1980

[30] Foreign Application Priority Data

Apr. 25, 1980 [DE] Fed. Rep. of Germany ....... 3016038

[51] Int. Cl.³ .......................................... G03B 27/72
[52] U.S. Cl. .................................... 355/35; 355/45; 355/77
[58] Field of Search ....................... 355/32, 35, 37, 45, 355/88, 77; 352/66

[56] References Cited

U.S. PATENT DOCUMENTS

| 3,443,868 | 5/1969 | Mitchell | 355/32 |
| 3,690,763 | 9/1972 | Mitchell | 355/35 |

FOREIGN PATENT DOCUMENTS

| 1522946 | 2/1970 | Fed. Rep. of Germany . |
| 2249355 | 4/1973 | Fed. Rep. of Germany . |
| 2620719 | 11/1976 | Fed. Rep. of Germany . |
| 1055990 | 1/1967 | United Kingdom . |

Primary Examiner—L. T. Hix
Assistant Examiner—Alan Mathews
Attorney, Agent, or Firm—Frishauf, Holtz, Goodman & Woodward

[57] ABSTRACT

To control projection of intensity and spectral balance of color transparencies being projected on photographic paper for enlargement, a color analyzer (2) is provided which has an illuminating plane (12) formed as a screen or a groundglass, which receives a first central portion (11) the projected image from the enlarger, or at least a major portion thereof and on a surrounding framing portion (15; 31b) a reference light source, in which, prior to use with random transparencies to be printed, the relative intensities and color balances of the reference frame and the light from the enlarger have been adjusted by gray-scales, for white light, and if desired, color balance by filters (14, 34; 5; 6; 7) at a given diaphragm (D) setting of the enlarger; the same relative light intensity of frame and projected image on the imaging plane (12) is then reproduced on the subsequent transparencies, to be printed by varying the light emitted from the enlarger, for example, and preferably by changing the diaphragm setting of the enlarger to obtain the previously adjusted match on the imaging plane (12). The apparatus, preferably, is supported on a swing post (3) from the enlarger to be placed in, and out of the beam (1a) of light from the enlarger.

13 Claims, 4 Drawing Figures

ANALYZER APPARATUS FOR MEASURING AND ADJUSTMENT OF COLOR FILTERING EFFECTS AND/OR EXPOSURE ON MAKING PHOTOGRAPHIC PRINTS

The invention relates to an apparatus with a picture screen for the evaluation of the effects of color filters and/or exposure on making photographic copies and enlargements, more specifically from positive transparencies.

BACKGROUND

It is difficult to make direct enlargements from color transparencies on reversal paper, since the conditions with respect to producing the right adjustment of the color mix filters of the enlarger, depend on:

1. The color sensitivity of the photographic paper used in each case,
2. The departure of the colors of the transparency from neutral gray (color cast or tint),
3. And the personal taste of the photographer with respect to the way in which the colors are to be reproduced.

So far, there have two main ways of measuring the filtering effect and making the desired adjustment thereto:

1. Judging the color transparency or a test print by eye, and
2. Using an electronic color analyser.

Trouble-free operation of such an electronic color analyser is only possible with transparencies when all colors of the picture are balanced in respect of their areas, that is to say when no one color is dominant, because, otherwise, the dominant color would be oppositely filtered out and colors would be changed in an undesired way. Furthermore, an electronic color analyser does not make possible any direct testing or control of the color shades produced or desired by a given photographer.

It is known, that, on judging colors by eye, the color hue and density of an image on photographic paper may be exactly evaluated under normal lighting conditions. This, however, is not the case for an enlarged image in a dark room, because the eye of a person gets used to any basic coloring of the light and will see this light, within certain limits, as "white" light in all cases.

Producing the right color adjustment of the enlarger or printer is, in all cases, dependent upon absolutely evaluating or measuring the color properties of the light coming from the enlarger.

THE INVENTION

One purpose of the present invention is that of designing an apparatus which can be adjusted for the properties of the photographic paper used and then makes possible judging or evaluation of brightness and color by eye.

The present invention is based on the effect that the power of absolutely judging colors is only produced when the eye has a chance of making a comparison.

In operation of the present invention, the eye of the operator or attendant is able to see, on a picture screen, firstly the image projected by the enlarger, and secondly, a reference light produced by an analyzer.

The reference light may be seen at the same time in the field of view of the operator, for example as a white surround of the projected image. In a preferred form of the invention, the transparency is placed in the enlarger and the enlarger's filters are used for changing the coloring or hue of the light, coming from the enlarger, as desired. The analyser is fixed to the enlarger. The light coming from the enlarger is falling on the middle of a groundglass screen of the analyser. White reference light, coming from an incandescent lamp placed in the analyser is directed onto the screen as well and takes the form of a white surround near and at the outer edge of the groundglass screen. The operator undertakes adjustment of the filters and the diaphragm of the enlarger till the colors of the groundglass screen image are matched or in line with the desired colors, using the surround, taken to be white, for comparison.

The wording "white light" is herein taken to have the sense of light consisting of any spectral colors so mixed that, subjectively, it is seen by the operator as being white.

DRAWINGS

Figure 1:
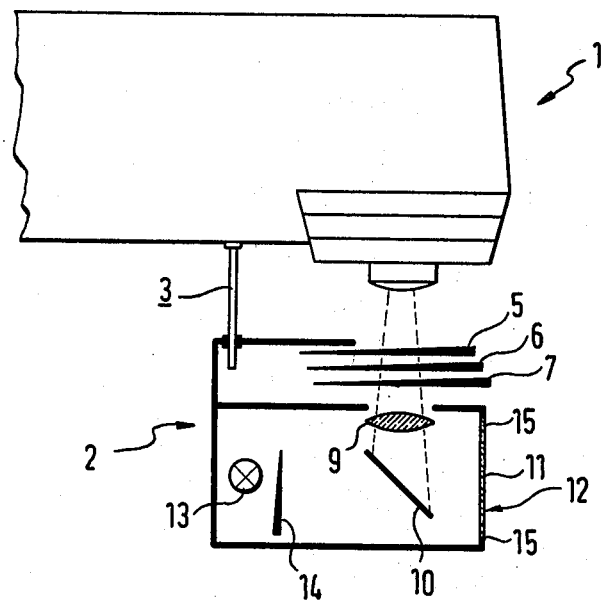
FIG. 1 is a diagrammatic sideview of part of a photographic enlarging apparatus for color transparencies and a section through a preferred example of a color analyser apparatus of my invention.
Figure 2:
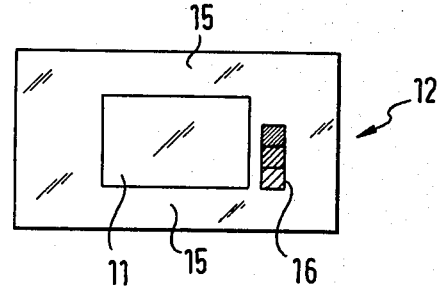
FIG. 2 is a view from the front of a groundglass screen as used in the analyser of FIG. 1.

A preferred working example utilizes a monitor or viewer for use with a color enlarging apparatus of widely used design. The color analyser apparatus 2 is positioned on a support 3 such that it may be turned into and out of position at the lower end of the enlarger 1. If the analyser has been turned clear of the way of the projection or copying light beam 1a coming from the enlarger 1, this light beam will be falling directly onto a sheet of photographic paper P (FIG. 3) itself. In the operating position (see FIGS. 1 and 3) in which the analyser 2 is turned into its working position, the light beam will go through three color correction filters 5, 6, and 7, as for example yellow, magent and cyan continuously graduated filters. Such color filters are used for the basic-matching in color of the analyser, for example to take into account the properties of the photographic paper used.

The light beam 1a then goes through a focussing optical system such as a convex lens 9 and by way of a mirror 10 is directed to the central area 11 of an imaging plane formed by a groundglass screen 12.

A reference light source 13 is located within the housing of the analyser. The reference light source is an incandescent lamp whose light goes through a movable gray wedge 14, which may be turned for adjustment of the brightness of the reference light for basic matching. The light then goes past the mirror 10 to the surround 15 of the groundglass screen 12 (see FIG. 3). In addition, in the surrounding area or outer part of the groundglass screen, a transparent comparison image 16 with gray graduations and test colors may be placed for making possible image comparison with respect to gray values and colors as well.

The sizes of the different parts of the structure are as such not important, the key to the design being the general teachings of the operation of the present invention. In the example given, the groundglass screen 12 is 10×8 cm in size. The light beam or projected light is focused with lens 9, having a focal length of about 7 cm, and is directed by a 3×2.5 cm mirror onto the groundglass screen. The reference light source is a 12 volt 20 watt tungsten quartz iodine or halogen lamp with a dispersing plate (not shown) for damping the light, placed in front of it.

For making the apparatus as simple and as low in price as possible,

1. The continuously graduated color filters 5, 6 and 7 may be made of normal trade-quality plastic foil, printed to be transparent in the form of a network.

2. The lamp 13 may be placed electrically in parallel to the enlarger's lamp and powered from the same current source, and 3. The quality of the optical parts 9 and 10 is only such as for producing a viewer image with a medium degree of sharpness or focussing.

OPERATION

The analyzer 2, as seen in FIG. 1, was pivotally secured to a Type M 605 Durst Enlarger. The analyzer 2 was placed out of the beam of light.

Figure 3:
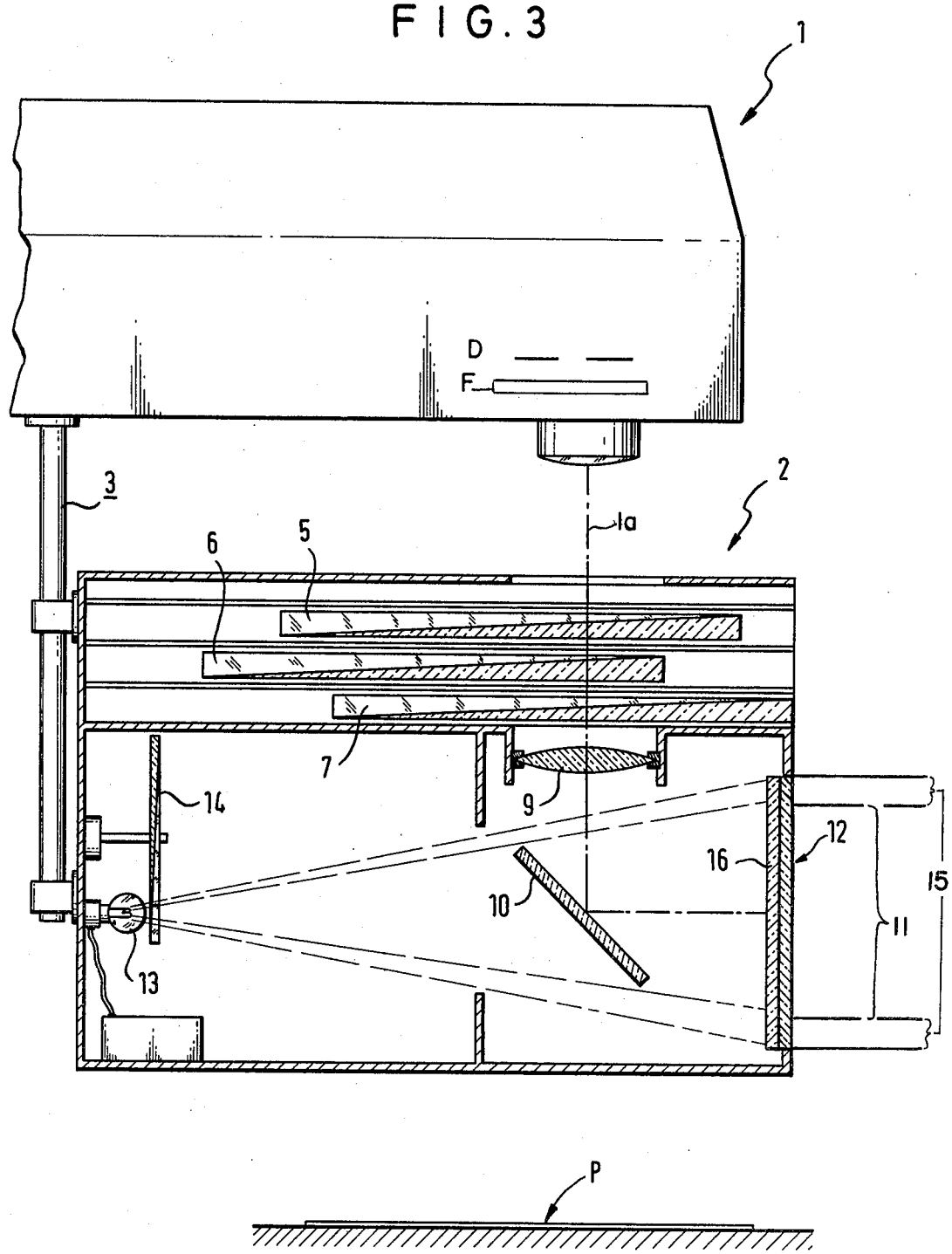
FIG. 3 is a more detailed side section view of the analyser of FIG. 1.

Basic adjustment and calibration of the analyser:

A color transparency was placed in the enlarger and in a normal way a print was produced on Ektrachrome RC 14 photographic paper at location P, FIG. 3. The exposure time was 4 sec. Then, the diaphragm D within enlarger 1 and the color filtering system F of the enlarger were adjusted until a neutral test picture, fully in order from the color point of view, had been produced.

While keeping this adjustment of the enlarger unchanged, the analyser 1 was now turned into a position within the light beam. The picture surround, able to be seen in the analyser, that is to say the reference light, was matched to the same brightness using the analyser's gray wedge 14, that is, to get the same brightness at the surrounding area 15 as that with which the transparency is seen on the central area 11 of screen 12 of the analyser. Then the continuously graduated filters 5, 6 and 7 were pushed into the light beam till the image in the analyser was seen to be neutral in color. At that position the pure white areas of the image in zone 11 had a tone not able to be seen to be different from the surrounding reference light in zone 15.

These steps so far take the form of the basic matching operation. For normal use any transparency, for example one with a color cast or tint, is placed in the enlarger. Then the diaphragm adjustment of the enlarger is changed together with the adjustment of the color head till the image seen in the analyser has been matched up in color to be in line with the surround of area 15. With the desired, right filtering effect by the filters F in the enlarger, any color cast of the transparency, to be seen in the analyser, is balanced or compensated. Without any further adjustments to the enlarger, prints are now made on the same Ektrachrome RC 14 photographic paper, keeping to the exposure time of 4 sec. Prints are produced whose colors are on 1 line with those earlier seen in the analyser.

For producing exact exposure times for other scales of enlarging, a seconds scale was fixed to the support post of the enlarger, having such divisions that in the case of the greater scale of enlargement the decrease in the amount of light for a given area is automatically balanced by longer exposure times.

Under normal conditions it is possible to make use, in place of the continuously graduated color filters, of gelatine insert filters with an upper limit of 10 for the density.

In an other form of the invention it is possible to make use of one eyepiece and two spaced or separate viewing screen parts, one part for the projected light beam corresponding to zone 11 and the other part for the reference light corresponding to zone 15. The overall image, cut up by using this system, makes for a clear-cut division between the reference light and the projected image. The optical joining together, necessary for observation, of the two picture screen parts for forming a single field of view may be undertaken by placing the two parts one behind the other or by using an optical mirror system, for changing the direction of the light, as will be seen in the example of FIG. 4.

Figure 4:
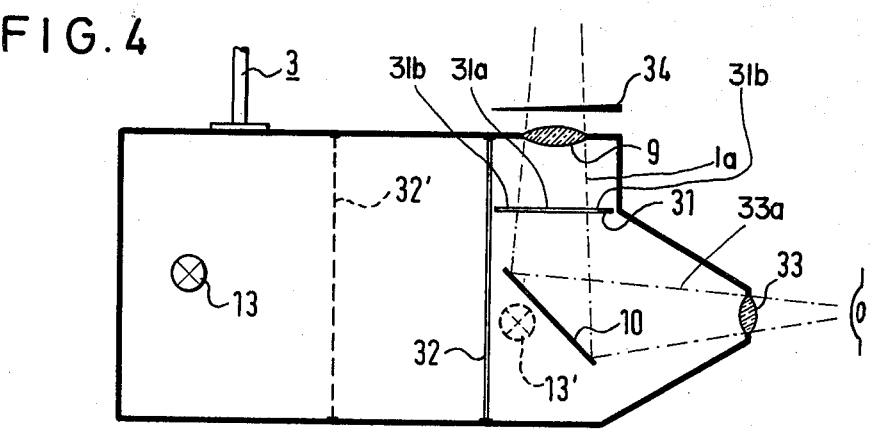
FIG. 4 is a diagrammatic side section view of a part of another example of the invention.

FIG. 4 is a cross-section of the apparatus which has a support 3, with which it may be fixed in position under the enlarger.

The projected light or light beam 1a from the enlarger is focussed by lens 9 on the horizontal groundglass screen 31. Using mirror 10, the groundglass screen image is viewed through the eyepiece 33, see viewing light path 33a. To the back of the mirror there is an upright groundglass screen 32, which is illuminated by the reference light source 13 so that the reference light around the mirror 10 may be seen using eyepiece 33 as well.

For brightness matching of a gray wedge 34 is used which, in this case, is placed in the beam path of the enlarger light. The color filters 5, 6 and 7 (FIGS. 1 and 3) are not shown in FIG. 4 in order to make it generally clearer.

It is furthermore possible to also place a second reference light source in back of the mirror 10 and illuminating an upright screen 32', in place of the groundglass section 32, as shown in FIG. 4. The image light from the enlarger 1 thus will illuminate portion 31a of groundglass 31 and the reference light the surrounding portion 31b.

The combination of the reference light and the projection light or beam may, generally speaking, be used with other systems such as dispersing plates, light guides etc. It is naturally possible to make use of more than two viewing screen parts.

It is naturally possible for the analyser apparatus detailed to be used for other dark room systems as for example transparency duplicators and printing machines for color print processing plants.

Various changes and modifications may be made.

Because, after some training or adaptation, it is possible for negative colors and brightness to be judged by the eye, the system of the invention may furthermore be used for color or black-and-white negatives.

We claim:

1. In a photographic reproduction process,
a method of evaluating spectral composition and brightness characteristics of a color transparency comprising, in accordance with the invention, the steps of:
projecting at least a major portion of the color transparency on a first portion (11) of an image plane (12, 31);
simultaneously projecting white reference light on a second portion (15) of the viewing screen, positioned closely adjacent said first portion;
observing the projected image of the at least major portion of the transparency;

comparing said projected image with the reference light at the adjacent second portion of the viewing screen;

and adjusting the light intensity of the projected image until the projected image on the first portion of the viewing screen and the projected reference light adjacent second portion of the viewing screen have a predetermined relationship.

2. Photographic reproduction color and brightness evaluation apparatus (2)

for combination with a transparency projection system (1), in which the transparency projection system provides a beam (1a) of light passing through at least a major portion of the transparency and has light intensity control means (D) to control the intensity of said beam, comprising, in accordance with the invention an imaging plane (12), having a first portion (11) positioned for imaging thereon of at least said major portion of the transparency;

a source of white reference light (13, 13') positioned for illumination of a second portion (15) of said imaging plane, said second portion being positioned closely adjacent to said first portion, said imaging plane being positioned to be observable by an operator;

and means (14, 34) adjusting the relative light intensity of the image of the at least major portion of the transparency projected on the first portion of the illuminating plane and the illuminated second portion of the illuminated plane.

to permit, after an initial adjustment of said relative light intensity of said first and second portions of the illuminated plane, to match the relative adjustment upon subsequent control of the intensity of the beam of light by said light beam intensity control means (D) of the transparency projection system (1).

3. Apparatus according to claim 2 wherein said transparency projecting system (1) comprises an enlarger;

a support post (3) depending from the enlarger, said apparatus being moveably mounted on said support posts for selective placement in light receiving relationship with respect to the beam (1a) of light passing through the enlarger, or outside of said beam.

4. Apparatus according to claim 2 wherein (FIG. 3) said imaging plane comprises a screen (12).

5. Apparatus according to claim 2 wherein (FIG. 3) said imaging plane comprises a groundglass (31).

6. Apparatus according to claim 2 further including a mirror (10) located to receive said beam of light (1a) from said transparency projection system (1) and directing the beam on said first portion (11) of the imaging plane (12), said reference light (13) being positioned behind the mirror (10), the mirror partially blocking light beams from said reference light (13) and permitting passage of light beams from said reference light to form said second illuminated portion (15) in the shape of a lighted frame surrounding the at least major portion of the transparency projected on the first portion of the screen.

7. Apparatus according to claim 2 wherein said screen (31) comprises a groundglass positioned in the path of the beam of light (1a) from the transparency projection system and having said at least major portion of the transparency projected on the first portion thereof;

said reference light (13) providing a reference light frame forming said second portion (31b) surrounding the first portion (31a) on the image plane (12);

and a mirror (10) positioned to block direct viewing of said source of white reference light (13, 13') while permitting viewing only of the surrounding frame forming the second portion (31b) as well as the projected at least major portion of the transparency on said first portion (31a).

8. Apparatus according to claim 7 further including an eyepiece (33) for viewing, simultaneously, said first and second portion of the image plane (12).

9. Apparatus according to claim 2 wherein (FIG. 3) the relative intensity adjustment means comprises a variable density filter (14) placed in front of the source of white reference light.

10. Apparatus according to claim 2 wherein (FIG. 4) the relative adjustment means comprises a variable density filter (34) positioned in the beam (1) of light passing through the at least major portion of the transparency.

11. Apparatus according to claim 9 or 10 wherein the relative adjustment means further comprises variable color composition filters (5, 6, 7) located to modify the light illuminating at least one of said first or second portions (11, 15; 31a, 31b) of the illuminating plane.

12. Apparatus according to claim 9 or 10 further including (FIG. 3) variable color filters (5, 6, 7) positioned to be traversed by the beam of light (1a) passing through the at least major portion of the transparency.

13. Apparatus according to claim 2 wherein said first portion (11, 31a) is positioned on a central part of the imaging plane (12);

and said second portion (15, 31b) is positioned on a contiguous adjacent portion forming a surrounding frame around said first portion.

* * * * *